United States Patent

[11] 3,537,572

[72] Inventor Otto Carl Scherfel
 Academy Gardens, Pennsylvania
[21] Appl. No. 707,803
[22] Filed Feb. 23, 1968
[45] Patented Nov. 3, 1970
[73] Assignee Manganese Steel Forge Company
 Philadelphia, Pennsylvania
 a corporation of Pennsylvania

[54] BELT STRUCTURE
 7 Claims, 5 Drawing Figs.
[52] U.S. Cl. .................................................. 198/201
[51] Int. Cl. .......................................... B65g 15/40
[50] Field of Search ........................................ 198/201

[56] References Cited
UNITED STATES PATENTS
1,957,698 5/1934 Cope ............................ 198/201
2,091,213 8/1937 Pink ............................. 198/201
2,626,041 1/1953 Ipsen ........................... 198/201
2,928,523 3/1960 Neidhard ....................... 198/201
2,114,182 4/1938 Guba ............................ 198/201

Primary Examiner—Richard E. Aegerter
Assistant Examiner—Roger S. Gaither
Attorney—John F. A. Earley ABSTRACT: A friction belt structure comprising a series of spaced cross rods having ends which are turned up to form end portions connected to a cross portion by bends, said cross rods being paired together, an edge plate mounted on each of the paired end portions, and helically coiled wires in interlooped engagement around the cross wires. The end portions of the paired rods are inclined toward each other like the sides of a capital "A", the rods are welded to the edge plates at the top and bottom of the end portions, the edge plates have end faces which incline toward each other from bottom to top so as to give the belt structure a back break, a cross rod which is free of end plates is positioned between the paired cross rods connected to edge plates, and the edge plates are offset and include an inner section connected to an outer section by a transverse section.

Patented Nov. 3, 1970

3,537,572

INVENTOR
OTTO CARL SCHERFEL

BY

*John F. A. Earley*

ATTORNEY

BELT STRUCTURE

BACKGROUND OF THE INVENTION

In environments where wire belts are required to support heavy loads, such as in the automotive field where wire belts are required to support forgings and castings at temperatures in the range of between 1,200 to 1,500°F., the belts must be provided with an edge member in order to retain the forged and cast parts so that the parts do not fall off the belt.

Numerous types of edges have been provided for friction drive belts but none of them have been completely satisfactory. Some edges, like telescoping edges, require very large pulleys.

In another type of edge, a bar has been welded to the bottom of an edge plate and the bar has then been inserted into the wire helix and welded to the spirals. This has not been satisfactory for several reasons. In welding the bar, which is thicker than the wire, the wire is likely to be burned and the wire fabric damaged. Another disadvantage of this construction is that the load of articles on the belt tend to push outwardly against the edge plates so that all the stress is acting on the bottom of the plate and breaks the weld. Also, when the belt is operating the articles being carried can get caught between edge plates and break the weld.

Another belt has used edge plates having holes in the bottom with cross rods going through the holes and welded thereto. This is also a weak construction. For example, a part or article being carried by the belt could snag between the inside edge or wall of the furnace in which the belt is positioned and the outside of the edge plate to push the plate inwardly and break the weld.

SUMMARY OF THE INVENTION

Accordingly, it is an object of this invention to provide a friction belt structure which is capable of withstanding a great deal of abuse and still retain the parts or articles which are being carried and transported by the belt.

The objects of the invention are accomplished by providing a friction belt structure with heavy cross rods, pairing the cross rods, bending the ends of the cross rods, and then welding an edge plate to pairs of the rod ends. The rods are welded at the bottom and at the tip of the ends, DESCRIPTION and they provide a great deal of support, strength and stability to the edge plates. The friction belt of this invention is very strong and capable of withstanding abuse and considerable back break, and is especially adapted for use in draw or heat-treating furnaces, or in ovens.

BRIEF DESCRIPTION OF THE DRAWINGS

Other objects and advantages of this invention, including its simplicity and economy, as well as the ease with which it may be adapted to existing equipment, will further become apparent hereinafter and in the drawings, in which.

DESCRIPTION OF THE PREFERRED EMBODIMENT

Figure 1:
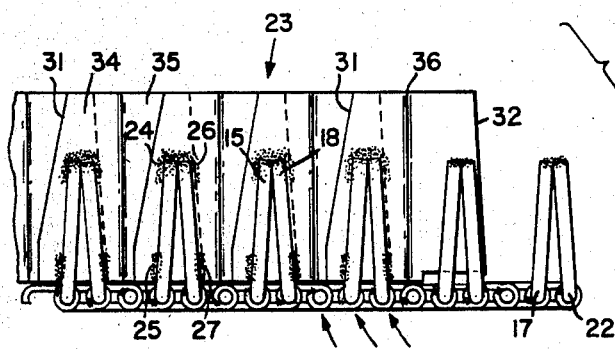
FIG. 1 is a partial view in side elevation of a friction belt structure constructed in accordance with this invention.
Figure 2:
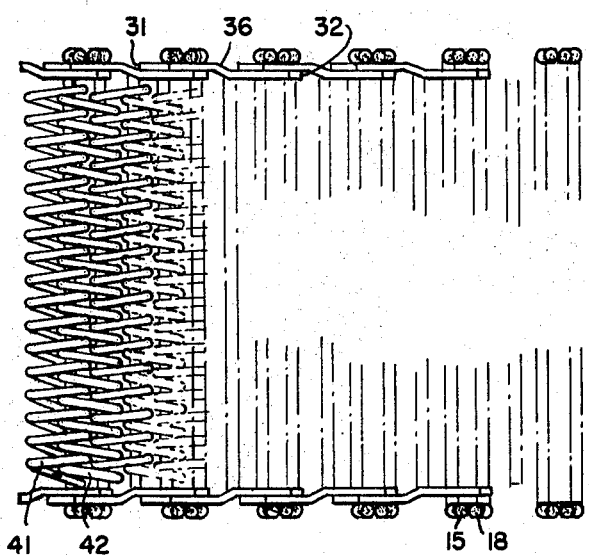
FIG. 2 is a top plan view of the belt structure shown in FIG. 1.
Figure 5:
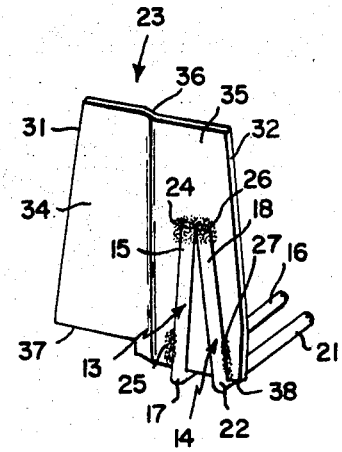
FIG. 5 is a view in perspective showing one of the edge plates of the belt structure.

Turning now to the specific embodiment of the invention selected for illustration in the drawings, there is shown a friction belt structure 11 having a series of spaced cross rods 12, 13 and 14. Cross rod 13 has ends which are turned up to form end portions 15 connected to a cross portion 16 by bends 17. Cross rod 14 has ends which are turned up to form end portions 18 connected to a cross portion 21 by bends 22.

Cross rods 13 and 14 are paired together with the end portions 15 and 18 of each pair being inclined toward each other like the sides of a capital "A".

An edge plate 23 is mounted on each of the paired end portions 15 and 18. Edge plate 23 is attached to the top of end portion 15 by a weld 24 and to the bottom of end portion 15 by a weld 25. Edge plate 23 is attached to the top of end portion 18 by a weld 26 and to the bottom by a weld 27. The welds 24 to 27 provide a great deal of support, and give the plate a great deal of stability and strength.

Figure 4:
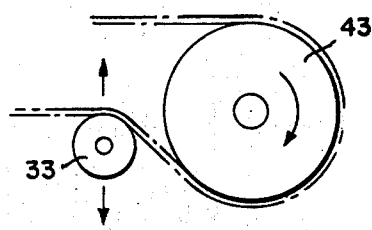
FIG. 4 is a view in side elevation and shows the belt structure as it travels around a takeup roller and illustrates the belt under back-break conditions.

Edge plates 23 include end faces 31, 32 which incline toward each other from the bottom to the top so as to give the belt structure a back break in going over a roller such as takeup roller 33 shown in FIG. 4. Edge plates 23 are offset and include an inner section 34 which is connected to an outer section 35 by a transverse section 36. A portion of the bottom of section 34 is cut away so that bottom face 37 of section 34 is spaced upwardly from bottom face 38 of outer section 35.

Cross rod 12 is free of end plates and is positioned between pairs of cross rods 13—14 which are connected to edge plates, and the ends of cross rods 12 are welded to the ends of helical wires. A plurality of helically coiled wires 41, 42 are provided and are arranged in interlooped engagement around the cross rods.

Figure 3:
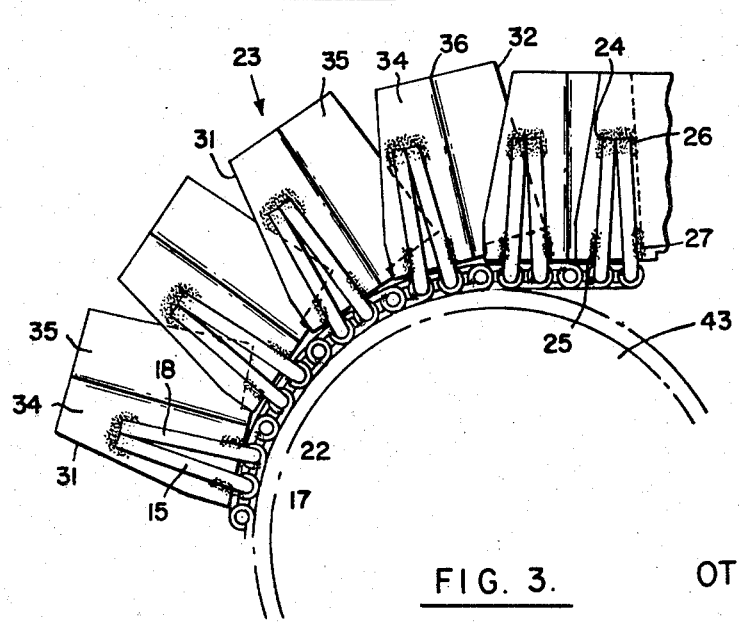
FIG. 3 is a view in side elevation illustrating the belt structure as it travels around a pulley.

In operation, the helical wires 41, 42 support the parts or articles to be carried by the conveyor 11 through a furnace or the like, and the edge plates 23 prevent the parts or articles from falling off the belt. FIG. 3 illustrates the position of the belt components in traveling around a pulley 43, and FIG. 4 illustrates the position of the belt components in back break position traveling around a takeup roller 33.

The overlapping of offset edge plates 23 gives a smooth inside surface to the edge plates and accordingly provides less chance for the articles being carried by the conveyor to hook or snag in the edge plates. However, overlapping or shingle plates could be used instead of the offset plates if that were desired.

In the friction belt structure 11 shown in the drawings, a cross rod 12 is skipped between plates 23, but every cross rod could be attached to the plate if that were desirable. However, skipping cross rods is more economical.

It is to be understood that the form of the invention herewith shown and described is to be taken as a presently preferred embodiment. Various changes may be made in the shape, size and arrangement of parts. For example, equivalent elements may be substituted for those illustrated and described herein, parts may be reversed, and certain features of the invention may be utilized independently of the use of other features.

I claim:

1. A friction belt structure comprising a series of spaced cross rods having horizontal cross portions with ends which are bent vertically to form end portions, said end portions being paired together, means rigidly connecting the paired end portions together, an edge plate rigidly mounted on each of the paired end portions, and helically coiled wires in interlooped engagement around the cross portions.

2. The belt structure of claim 1, wherein the end portions of said pairs of rods are inclined toward each other like the sides of a capital "A".

3. The belt structure of claim 1, wherein the rods are welded to the edge plates at the top and bottom of the end portions.

4. The belt structure of claim 1, wherein the edge plate has end faces which incline toward each other from bottom to top so as to give the belt structure a back break in going over a roller and the like.

5. The belt structure of claim 1, wherein a cross rod which is free of end plates is positioned between pairs of cross rods connected to edge plates.

6. The belt structure of claim 1, wherein the edge plates are offset and include an inner section which is connected to an outer section by a transverse vertical section.

7. The belt structure of claim 1, wherein the end portions of said pairs of rods are inclined toward each other like the sides of a capital "A", the rods are welded to the edge plates at the top and bottom of the end portions, the edge plates have end faces which incline toward each other from bottom to top so as to give the belt structure a back break in going over a roller and the like, a cross rod which is free of end plates is positioned between the pairs of cross rods connected to edge plates, and the edge plates are offset and include an inner section which is connected to an outer section by a transverse section.